United States Patent Office 2,794,046
Patented May 28, 1957

2,794,046

METHOD OF REDUCING AROMATIC NITROGEN COMPOUNDS

Allen Walter Sogn, Williamsville, N. Y., assignor to Allied Chemical & Dye Corporation, New York, N. Y., a corporation of New York No Drawing. Application August 6, 1954, Serial No. 448,376

20 Claims. (Cl. 260—569)

This invention relates to an improved method of reducing aromatic nitrogen compounds containing nitrogen in a reducible form as a substituent of a benzene nucleus (that is, as a substituent of a hydrogen atom forming part of a benzene nucleus) and at a higher stage of oxidation than the hydrazo stage. It relates more particularly to improvements in the methods of reducing such aromatic nitrogen compounds in alkaline media, for the production of hydrazo compounds and other reduction products of a higher stage of oxidation.

A particular feature of the present invention relates to a novel process for the reduction of such aromatic nitrogen compounds which also contain as a nuclear substituent at least one labile halogen atom, and particularly a labile chlorine atom.

The primary object of the present invention is to provide a novel method of carrying out the alkaline reduction of aromatic nitrogen compounds of the type referred to above.

A further object of the present invention is to provide a method for the reduction of water-insoluble aromatic nitrogen compounds containing nitrogen in a reducible form as a substituent of a benzene nucleus at a higher stage of oxidation than the hydrazo stage, whereby the production of reduction products of the group consisting of azoxy, azo and hydrazo compounds is effected under mild reaction conditions and the production of primary amines is repressed.

Another object of the present invention is to provide an improved method for the reduction of aromatic nitrogen compounds containing nitrogen in a reducible form as a substituent of a benzene nucleus at a higher stage of oxidation than the hydrazo stage, and further containing as a nuclear substituent at least one labile halogen atom, and especially a labile chlorine atom.

A specific object of the present invention is to provide an improved process for the alkaline reduction of mononuclear aromatic mononitro compounds containing halogen, and especially chlorine, as a nuclear substituent ortho to the nitro group, and especially of ortho-chloro-nitrobenzene and reduction products thereof.

Additional objects in part will be obvious and in part will appear hereinafter.

The reduction of aromatic nitrogen compounds of the above type for the production of aromatic hydrazo compounds, particularly in connection with the manufacture of benzidine and related diamino-biphenyl compounds, presents a number of problems in view of the nature of said compounds and the intermediate products formed. Unless precautions are taken, the reduction products are mainly aniline or other primary amines, and/or large quantities of hydrogen are evolved. Thus, under acid conditions, the products are mainly primary amines. Alkaline reducing agents, such as alkali metal alcoholates, ordinarily are not sufficiently effective reducing agents to carry the reduction beyond the azoxy stage unless high temperatures and pressures are employed. Zinc, commonly employed with caustic alkalis, is expensive and requires additional processing operations to effect removal of the zinc oxide formed as a by-product.

The reduction of reducible aromatic nitrogen-containing compounds having a labile halogen (e. g. chloro) substituent presents a special problem owing to the reactivity of the labile halogen atom. While it was known to reduce other aromatic nitrogen compounds to azoxy compounds by heating with metal alcoholates in strongly alkaline media, such reducing agents cannot be employed economically for the reduction of reducible aromatic nitrogen compounds containing a labile halogen substituent because the halogen atom reacts with the metal alcoholate to form ethers. Therefore, the reduction of ortho-halogen nitro aromatic compounds and similar reducible aromatic nitrogen compounds having a labile halogen atom as a substituent, as well as the corresponding azoxy and azo compounds, has been carried out by means of zinc and caustic alkali or similar reducing agents.

According to the present invention, the foregoing objects are accomplished and other benefits are secured by carrying out the reduction of reducible aromatic nitrogen compounds of the above type by means of an aldehyde free from aliphatic hydroxyl groups adjacent to the aldehyde oxo radical (the —CHO group) and a caustic alkali in a reaction medium in which naphthoquinoid reduction promoter has been incorporated.

I have discovered that such aldehydes will function as reducing agents for reducible aromatic nitrogen compounds (including those containing a labile halogen substituent) in a caustic alkaline reaction medium, if there is incorporated into the reaction medium one or more naphthoquinoid reduction promoters, even in small amount. I have discovered that the inclusion of a naphthoquinoid reduction promoter in the reaction mixture influences the reaction in such an advantageous manner that the aldehyde and caustic alkali are capable of reducing nitrobenzene and related insoluble mononuclear aromatic nitro compounds to the corresponding azoxy compounds in an aqueous reaction medium under ordinary conditions of temperature and pressure. This result is surprising because, as pointed out by Rotarsky in Bulletin de la Société Chimique de France, Series 4 (1907), vol. 2, page 607, such nitro compounds cannot be reduced by aldehydes and aqueous caustic alkalis at any temperature.

For the production of reduction products of a lower stage of oxidation (greater stage of reduction) than the azoxy stage under ordinary temperature and pressure conditions, the reduction is preferably carried out in a reaction medium which also contains a water-miscible solvent, more particularly a lower monohydric alcohol (such as methanol, ethanol, or a propanol) and especially methanol.

I have discovered that when such a water-miscible solvent is included in the reaction medium, the reduction can be carried completely through to the hydrazo stage without requiring drastic reaction conditions of temperature and pressure. Even when a lower alcohol is employed as the solvent, the reaction can be carried out so rapidly and under such mild reaction conditions that the main reducing effect is brought about by the aldehyde rather than by the alcohol. Furthermore, when the reducible aromatic nitrogen compound contains a labile halogen substituent, little ether formation occurs under the mild reaction conditions at which the reduction with aldehydes takes place, notwithstanding the presence of the alcohol and caustic alkali.

The class of naphthoquinoid reduction promoters employed in the practice of the present invention includes all of the various napthoquinones, derivatives, and related compounds which are effective as reduction promoters in the reduction of said aromatic nitrogen compounds by alcoholic caustic alkali, specifically sodium methylate.

As disclosed in my Patent No. 2,645,636, the addition of naphthoquinones or various derivatives thereof to the reaction medium, in the reduction of reducible aromatic nitrogen compounds of the type referred to above by the action of metal alcoholates, especially alkali metal alcoholates and particularly a sodium methylate reaction medium resulting from the reaction of sodium hydroxide and methanol, exerts a beneficial promoting effect upon the reaction whereby the reaction is accelerated and/or the reduction can be carried to a higher stage of reduction without requiring drastic operating conditions, and other benefits are secured. As disclosed in said patent, various naphthoquinones, and especially 1,4-naphthoquinones, and various derivatives thereof exert this beneficial reduction promoting effect; including substituted naphthoquinones (such as, those in which one or more of the hydrogen atoms of the naphthoquinone nucleus are substituted by another atom or radical), addition compounds of such naphthoquinones (such as, with bisulfites and heavy metal salts), functional derivatives of such naphthoquinones (for example, imides, oximes, semicarbazones and hydrazones), and tautomers and isomers capable of isomerizing to such naphthoquinones. Specific illustrative compounds of said type are: 1,4-naphthoquinone, 1,2-naphthoquinone, 2,3-dichloro-1,4-naphthoquinone, 2-methyl-1,4-naphthoquinone, 2-anilino-1,4-naphthoquinone, 2-hydroxy-1,4-naphthoquinone, 1,4-naphthoquinone-2-sulfonic acid, 1,4-naphthoquinone oxime, and the sodium bisulfite addition product of 1,4-naphthoquinone.

I have also found that certain of such derivatives are specially effective as reduction promoters for such reductions, namely, condensed nuclear substitution derivatives of naphthoquinones in which a heterocyclic nucleus is condensed with the quinone nucleus of the naphthoquinone through two adjacent carbon atoms of said nucleus, and especially, 1,4-naphthoquinone-furans and -thiofurans (for example, dinaphtho(2,1,2',3')furan-8,13-dione, dinaphtho(1,2,2',3')furan-7,12-dione, naphtho (2,3-b)-furan-4,9-dione, 2-methylnaphtho(2,3-b)furan-4,9-dione, benzo(b)naphtho(2,3-d)furan-6,11-dione, benzo(b)thiophanthrene-6,11-dione, 8-chlorobenzo(b)thiophanthrene-6,11-dione, 3-hydroxybenbo(b)naphtho(2,3-d)furan-6,11-dione, 8,13-diacetoxy-dinaphtho(2,1,2',3')furan, 3-methoxydinaphtho(2,1,2',3')furan-8,13-dione, dinaphtho(1,2,2',3')furan-7,12-dione-5-sulfonic acid, dinaphtho(2,3,2',3')furan-5,7,12,13-tetrone, dinaphtho(2,1,2',3')thiophene-8,13-dione, 5-chlorodinaphtho(1,2,2',3')furan-7,12-diol), as disclosed in my application Serial No. 522,164, filed July 14, 1955.

Furthermore, as disclosed in my Patent No. 2,684,358, this reduction promoting effect upon the reducing action of alkali metal alcoholates on reducible aromatic nitrogen compounds of the type referred to above is also brought about by quinoid hydroxynaphthalene compounds; namely, hydroxynaphthalenes having a total of at least two nuclear substituents of which not more than two are hydroxyl groups and of which substituents two are in the same benzene ring of the naphthalene nucleus in quinoid relation to each other, one of said substituents in quinoid relation being a hydroxyl group and the other of said substituents in quinoid relation being a hydroxyl group or an amine radical, functional derivatives of such compounds, and substituted derivatives of such compounds (for example, 1,4-dihydroxy-naphthalene, 1,4-dihydroxy-naphthalene-2-sulfonic acid, 4-amino-1-hydroxy-naphthalene, 4-amino-1-hydroxy-naphthalene-2-sulfonic acid, 2-amino-1-hydroxy-naphthalene, 2,3-dihydroxy-naphthalene, 2,3-dihydroxy-naphthalene-6-sulfonic acid, 1-amino-2-hydroxy-naphthalene, 1-amino-2-hydroxy-naphthalene-4-sulfonic acid, 4-phenylamino-1-hydroxynaphthalene).

And, as disclosed in application Serial No. 290,089, filed May 26, 1952, by Francis W. Cashion, a special class of naphthoquinone addition products particularly useful for promoting the reducing action of alkali metal alcoholates on said reducible aromatic nitrogen compounds are the addition products of naphthoquinones with sulfiding compounds; such as, hydrogen sulfide, monosulfides, hydrosulfides, polysulfides, thiosulfates, thiocarbonates, hydrosulfites, thiocyanates and related compounds which react with quinones to form reduction products containing, as a nuclear substituent, sulfur to which is linked a cation, sulfur or a carbon atom, which sulfiding compounds when in the salt form have the cation in the form of a light metal, and especially an alkali metal, or ammonia or an organic amine (for example, addition products of 1,4-naphthoquinone with sodium sulfide, ammonium sulfide, sodium hydrosulfide, and ammonium hydrosulfide).

As disclosed in application Serial No. 450,784, filed August 18, 1954, by Leigh C. Anderson and Chester E. Smith, Jr., the reduction promoting effect upon the reducing action of alkali metal alcoholates on reducible aromatic nitrogen compounds of the type referred to above is also brought about by ortho-cycloalkano-benzoquinoid compounds, such as ortho-cycloalkano-benzoquinones (benzoquinones in which two adjacent carbon atoms of the quinone nucleus other than those forming part of the carbonyl groups are linked respectively to the end carbon atoms of a chain of at least 3 carbon atoms, and preferably 4 carbon atoms, of which at least 2 are saturated carbon atoms and the others may be unsaturated—whether free from other substituents in the benzene nucleus besides the carbonyl oxygen atoms and the cycloalkano radical, or containing additional substituents in the benzene nucleus wherein one or more of the hydrogen atoms of the benzene nucleus is substituted by another atom or radical); addition compounds of such benzoquinones, e. g., with hydroquinones, bisulfites, heavy metal salts, sulfiding compounds, etc.; functional derivatives and tautomeric forms of such benzoquinones capable of isomerizing to such benzoquinones, e. g., imides, oximes, semicarbazones and hydrazones; and hydroquinones corresponding to such benzoquinones (for example, 2,3-cyclopropano-1,4-benzoquinone, 2,3-cyclobutano-1,4-benzoquinone, 2,3-cyclobutano-benzohydroquinone, 6-chloro-2,3-cyclobutano-1,4-benzoquinone, 2,3-cyclobuteno-1,4-benzoquinone, 2,3-cyclobutano-1,4-benzohydroquinone diacetate, 2,3-(2'-chloro-cyclobuteno)-1,4-benzohydroquinone).

And, as disclosed in application Serial No. 448,378, filed of even date herewith, by A. V. Erkkila, effective reduction promoting influence upon the reducing action of alkali metal alcoholates on reducible aromatic nitrogen compounds of the type referred to above is produced by certain condensed polynuclear dioxy compounds (diketones, hydroxy-ketones, addition compounds thereof— such as with the bisulfites disclosed in my Patent No. 2,645,636—functional derivatives, and tautomeric forms thereof capable of isomerizing thereto, and corresponding dihydroxy compounds in which the keto groups are replaced by

groups; which contain at least 10 nuclear carbon atoms; namely, those in which one of the nuclei consists of a 6-carbon atom alicyclic dioxy radical having the oxy substituents in quinoid relation to each other, at least 2 of the nuclear carbon atoms of said dioxy radical other than those bearing the oxy substituents being saturated carbon atoms (for example, condensed polynuclear derivatives of cyclohexandiones, cyclohexendiones, cyoclohexandiols and cyclohexendiols, having the oxy groups in 1,2- or 1,4-relation, such as 1,2- and 1,4-dioxy-naphthanes and especially 1,4-naphthandiones and 1,4-naphthandiols). Specific illustrative examples of compounds of said type are: $\Delta^{5,7,8a}$-naphthantriene-1,4-dione, $\Delta^{2,6}$-naphthandiene- 1,4-dione, Δ⁶-naphthanene-1,4-dione, 2,3-dichloro-Δ⁵,⁷,⁸ᵃ-naphthantriene-1,4-dione, 2,3-epoxy-Δ⁵,⁷,⁸ᵃ-napthantriene-1,4-dione, 5,8-endomethylene - Δ²,⁶ - naphthandiene-1,4-dione.

Thus, the expression, "napthoquinoid reduction promoter" as employed herein, including the claims, denotes and includes all of the foregoing naphthoquinones, derivatives and related compounds.

In the practice of the present invention, the reducible aromatic nitrogen compound is subjected to the reducing action of an aldehyde free from aliphatic hydroxyl groups adjacent to the aldehydic oxo radical and a caustic alkali dissolved or suspended in a suitable reaction medium, such as water, a water-miscible solvent, or an aqueous solution of such solvent, to which one or a plurality of the naphthoquinoid reduction promoters also have been added or otherwise incorporated, preferably in small amount.

In the preferred practice of the present invention, the aldehyde is gradually added to a mixture of the other reaction ingredients. For example, the naphthoquinoid reduction promoter, the aromatic nitrogen compound to be reduced and the caustic alkali are preferably mixed with water, a water-miscible solvent, or an aqueous solution of the solvent, and the aldehyde is added, in small portions, to the resulting mixture. This procedure makes possible, in a simple and effective manner, control of the strongly exothermic reduction reaction, and avoids having in the reaction mixture large amounts of aldehyde relative to the amount of unreacted nitrogen compound present.

Various aldehydes free from aliphatic hydroxyl groups adjacent to the aldehydic oxo radical can be employed in the practice of the present invention. Thus suitable aldehydes include aliphatic aldehydes of said type, and especially those containing 1 to 4 carbon atoms ( e. g., lower alkanals), aromatic aldehydes of said type (e. g., aryl aldehydes), and heterocyclic aldehydes of said type (e. g., furane aldehydes); for example, formaldehyde, acetaldehyde, propionaldehyde, butyraldehyde, benzaldehyde and furfuraldehyde. Instead of the aldehydes themselves, stabilized forms thereof and compounds capable of reverting to aldehydes in the caustic alkaline reaction media can be employed (for example, paraformaldehyde and hexamethylenetetramine) and in some cases are preferred, as where the anhydrous form of the aldehyde is desired. Accordingly, the term "aldehyde" as employed herein, including the claims, includes not only the aldehydes themselves but such other forms of the aldehydes. Formaldehyde (in aqueous form or in the form of paraformaldehyde) is preferred in view of its low cost, efficiency and ready availability.

Preferably sodium hydroxide is employed as the caustic alkali in view of its low cost and efficiency. However, other caustic alkalis and especially alkali metal hydroxides may be employed, as, for example, potassium hydroxide.

The reduction of aromatic nitro compounds to azoxy compounds (I), of azoxy compounds to azo compounds (II), and of azo compounds to hydrazo compunds (III) proceeds according to the following equations, in which R is a benzene nucleus, R' is hydrogen or the organic radical of the aldehyde, and the caustic alkali is sodium hydroxide:

(I)
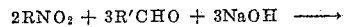

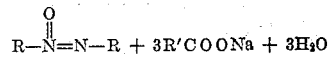

(II)

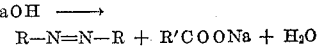

(III)

When the process of the present invention is carried out in an aqueous medium under ordinary temperatures and pressures, the reduction of a nitro compound usually does not proceed substantially beyond the azoxy stage (I). When the reduction is carried out in the presence of a water-miscible organic solvent, such as a monohydric alcohol containing 1 to 3 carbon atoms and preferably methanol, so as to effect a greater reduction and produce azo and hydrazo compounds, the water-miscible solvent may be employed in the presence or absence of water. The amount of water and/or water-miscible solvent employed is preferably at least sufficient to dissolve the caustic alkali and provide a readily stirrable reaction mixture. In general, the efficiency with which the reduction is promoted beyond the azoxy stage increases with an increase in the concentration of the water-miscible solvent in the reaction. Accordingly, in commercial practice it is preferable to employ a reduction medium containing at least about 50% by weight of methanol or other water-miscible solvent based on the content of said solvent and water in said medium.

The amount of caustic alkali employed is preferably in excess of the amount theoretically required in accordance with the foregoing equations, since an excess tends to increase the rate of reaction and to promote completion of the reduction. The concentration of caustic alkali in the reaction medium (water and/or solvent) may vary widely and is preferably between 5% and 50% by weight during the reaction.

The aldehyde is usually employed in an amount only slightly (e. g., about 10%) in excess of that theoretically required to effect the overall reduction desired (which may involve more than one reduction stage illustrated by above Equations I to III, as for example, in the reduction of azoxybenzene to hydrazobenzene); but larger amounts may be employed, if desired. In some cases, the use of a large excess of aldehyde may be disadvantageous, as in the reduction of 2-chloro-nitrobenzene with formaldehyde in aqueous sodium hydroxide, wherein the proportion of 2-chloro-analine formed as an undesired by-product increases with an increase in the amount of formaldehyde used beyond that theoretically required to produce 2,2'-dichloro-azoxy-benzene.

The reduction promoter can be incorporated in the reaction medium in various ways and at various times. Usually the reduction promoter is employed as such in forming the reaction mixture. If desired, it may be formed in the reaction mixture or in one of the components thereof; for example, the sodium bisulfite addition product of 1,4-naphthoquinone can be preliminarily formed by reacting the naphthoquinone and bisulfite in water or in methanol, and the resulting mixture can be employed in forming the reaction medium for the reduction, similarly to the procedure disclosed in my Patent No. 2,645,636.

The reduction promoter can be employed in various amounts. It is a feature of the present invention that even small amounts of the naphthoquinoid reduction promoters are effective in bringing about the reduction reaction. The minimum amount necessary to produce a significant reduction-promoting effect varies with the individual naphthoquinoid compound, nature of the aromatic nitrogen compound to be reduced, nature of the aldehyde, and the reaction conditions. Thus, concentrations ranging in proportions from about 1/450 mol to about 1/25 mol of naphthoquinoid compound, per mol of aromatic nitrogen compound, are usually employed. Generally, the promoter effect is enhanced by increasing the proportion of naphthoquinoid compound employed and is lessened by reducing the proportion of naphthoquinoid compound employed. Ordinarily, amounts greater than about 1/10 mol of naphthoquinoid compound per mol of aromatic nitrogen compound to be reduced are not advantageous, although they may be used if desired, since the increased cost of the extra naphthoquinoid compound is not sufficiently compensated by the additional benefits derived therefrom to be of commercial importance.

The temperature at which the reaction is carried out may vary widely, and is preferably between room temperature (about 30°) and 100° C., both inclusive. At lower temperatures the reaction is slower and requires costly cooling, while higher temperatures may require the use of closed vessels and/or promote the formation of relatively large amounts of primary amines.

The process of the present invention is generally applicable to the reduction of various aromatic nitrogen compounds containing nitrogen as a substituent of a benzene nucleus at a higher stage of oxidation than the hydrazo stage, and especially water-insoluble (particularly, unsulfonated) compounds of this class, such as nitrobenzene, 3-chloro-nitrobenzene, 4-nitro-anisole, 4-nitrobenzoic acid, 2-nitrobenzene sulfonic acid, 2,5-dimethyl-nitrobenzene and 3,3'-dimethylazoxybenzene. The process of the present invention is particularly of value in view of the extensive use of hydrazobenzene and its derivatives, especially those substituted in ortho position with respect to the hydrazo group, as intermediates for the manufacture of benzidine and related derivatives of benzidine; since it provides an improved method for manufacturing hydrazo compounds from the corresponding reducible aromatic nitrogen compounds, such as nitrobenzene, nitrotoluene, 2-nitroanisole, 2-nitrophenetole, 2,2'-azoxytoluene, 2,2'-azoxyanisole, azobenzene, 2,2'-azotoluene, 2,2'-azoanisole, etc.

The process of the present invention is especially advantageous for reducing 2-halogen nitrobenzenes (e. g., 2-chloro-nitrobenzene) and reduction products thereof (e. g., 2,2'-dichloro-azoxybenzene and 2,2'-dichloro-azobenzene), since it permits a more efficient reduction of such compounds to be obtained and produces less by-products resulting from replacement of the labile halogen atoms by OH and OCH$_3$ groups than the processes employing alkali metal alcoholates; the use of aldehydes as reducing agents enables the reduction to be carried out more rapidly and at lower temperatures, thereby minimizing side reactions with said halogen atoms.

The invention will be illustrated by the following specific examples, but it is to be understood that it is not limited to the details thereof and that changes may be made without departing from the scope of the invention. The temperatures are in degrees centigrade and the parts are by weight, unless designated as parts by volume in which case the amount signifies the volume occupied by the same number of parts by weight of water at 4° C.

EXAMPLE 1

*Part A.*—78.5 parts of 2-chloronitrobenzene having a setting point of 31.8°, one part of 2,3-dichloro-1,4-naphthoquinone, 0.5 part of sodium dodecylbenzene sulfonate (to aid in emulsifying the nitro compound), 80 parts of water and 137 parts of 50° Bé. aqueous sodium hydroxide were charged to a flask provided with a reflux condenser, agitator, dropping funnel, and water bath, and the mixture was heated to 50° with stirring. Then 70.2 parts of 36–38% aqueous formaldehyde solution were gradually added during one hour with vigorous stirring, while cooling to maintain the temperature of the reaction mixture at 50–55°. The mixture was further agitated at 50–55° for a half hour, then diluted with 200 parts of cold water, cooled to 20°, and filtered. The filter cake was purified by agitating it with a solution of 360 parts of 5% aqueous hydrochloric acid at 60–70°, cooling the mixture with agitation to congeal the oil as grains, filtering off the granular product and washing with cold water, and the resulting product was dried.

The product thus obtained consisted essentially of 2,2'-dichloro-azoxybenzene (it had a setting point of 55.2°) and corresponded in amount to substantially the theoretical yield of the azoxy compound.

*Part B.*—When the procedure of part A was repeated without the addition of the 2,3-dichloro-1,4-naphthoquinone, substantially no reduction occurred; little heat was evolved on addition of the formaldehyde, and 77.5 parts of a product were obtained which had a setting point of 30.6° and which gave a mixed setting point of 31.3° when mixed with equal parts of the 2-chloronitrobenzene starting material.

EXAMPLE 2

*Part A.*—A mixture of 66.8 parts of 2,2'-dichloro-azoxybenzene, one part of 2,3-dichloro-1,4-naphthoquinone, 76 parts of 50° Bé. aqueous sodium hydroxide and 80 parts of alcohol (2B denatured) was preheated to 60–65°. To the resulting hot mixture, 55 parts of 37% aqueous formaldehyde were added during about one hour while stirring, and the mixture thus obtained was stirred at 60–65° for a further half hour to complete the reaction. The mass was then diluted with water to a volume of 500 parts and filtered. The filter cake was washed with cold water and then with 110 parts of cold 10% aqueous hydrochloric acid, and was air dried at room temperature.

The dry product had a melting point of 80–84° and contained 91% of 2,2'-dichloro-hydrazobenzene (based on conversion to dichlorobenzidine and titration with nitrous acid). The yield was 34 parts, corresponding to about 49% of the theoretical yield of 2,2'-dichloro-hydrazobenzene. In addition, some 2-chloro-aniline was formed (22% of the theoretical yield, based on titration of the acidified mother liquor and acid wash liquor) as well as alkali soluble by-products which remained in the alkaline mother liquor.

*Part B.*—When the procedure of part A of this example was repeated without the addition of the 2,3-dichloro-1,4-naphthoquinone, little reduction was effected; 94% of the 2,2'-dichloro-azoxybenzene was recovered unchanged, and about 6% was converted to chloro-aniline.

Similar results were obtained by substituting methanol for the denatured alcohol used in Example 2; and a somewhat lower yield of hydrazo compound resulted when isopropanol was employed.

EXAMPLE 3

*Part A.*—To a mixture of 31.4 parts of 2,2'-dichloro-azobenzene, one part of 2,3-dichloro-1,4-naphthoquinone, 38 parts of 50° Bé. aqueous sodium hydroxide and 40 parts of methanol, 27 parts of 37% aqueous formaldehyde were gradually added during about one hour while stirring and maintaining the temperature at 40–45°. The resulting mixture was further stirred at 40–45° for 2 hours. The reaction mass was then worked up as described in Example 2.

The product consisted essentially of 2,2'-dichloro hydrazobene (it had a melting point of 82–84°). The yield was 30.5 parts, which corresponds to about 96% of theory. In addition, a small amount (about 1.7% of theory) of 2-chloro-aniline was formed.

*Part B.*—The procedure of part A of this example was repeated twice, in one case without the addition of 2,3-dichloro-1,4-naphthoquinone, in the other case without the addition of formaldehyde. In each case, 99% of the 2,2'-dichloro-azobenzene was recovered unchanged.

EXAMPLE 4

To a mixture of 33.4 parts of 2,2'-dichloro-azoxybenzene, one part of 2,3-dichloro-1,4-naphthoquinone, 17 parts of sodium hyroxide flakes, and 112 parts of methanol maintained at 45–50°, 12 parts of paraformaldehyde were introduced over the course of about one hour with stirring, and the resulting mixture was stirred at 45–50° for 17 hours. The reaction mixture was then worked up as described in Example 2.

The product thus obtained amounted to 32 parts, of which 16 parts were 2,2'-dichloro-hydrazobenzene (corresponding to 50% of the theoretical yield of 2,2'-dichloro-hydrazobenzene). The remainder consisted of a mixture of 2,2'-dichloro-azobenzene and 2,2'-dichloro-azoxybenzene. In addition, a small amount (2.5% of theory) of 2-chloroaniline was formed.

EXAMPLE 5

*Part A.*—146 parts of nitrobenzene, 275 parts of 50° Bé. aqueous sodium hydroxide, 160 parts of water and 2 parts of 2,3-dichloro-1,4-naphthoquinone were charged to a flask equipped as in Example 1. The mixture was heated to 50–55°, and 140 parts of 36–38% aqueous formaldehyde solution were introduced gradually with vigorous stirring over a period of about 2 hours, while maintaining the temperature at 50–55° by external cooling by means of the water bath. After completion of the formaldehyde addition, the reaction mixture was stirred at 50–55° for a further half hour and then was steam distilled, to remove a small amount of aniline together with unreacted nitrobenzene (1.5 parts). The residue was allowed to stand and separate into a lower aqueous phase and an upper oil phase. The oil phase was separated by decantation and boiled with 300 parts of hot dilute 10% hydrochloric acid. The mixture was filtered to clarify it and was allowed to stand and stratify. The resulting oil phase was separated from the aqueous phase by decantation, and was dried over calcium chloride in an oven at about 100°.

The product thus obtained consisted essentially of azoxybenzene (it had a setting point of 34.2°) and amounted to 104 parts, which corresponds to about 88% of the theoretical yield of azoxybenzene based on the nitrobenzene charged.

*Part B.*—When the procedure of part A of this example was repeated without the 2,3-dichloro-1,4-naphthoquinone, substantially no reduction of nitrobenzene occurred, as evidenced by the fact that the nitrobenzene was recovered almost quantitatively on steam distillation of the reaction mixture.

EXAMPLE 6

The procedure of Example 5, part A, was repeated using 216 parts of 36–38% aqueous formaldehyde. The product obtained as the oil layer, which amounted to 105 parts, consisted of azoxybenzene containing a small amount of azobenzene (it solidified at 32.2°). In addition, a small amount (1.5% of theory) of hydrazobenzene was formed.

EXAMPLE 7

*Part A.*—123 parts of nitrobenzene, 275 parts of 50° Bé. aqueous sodium hydroxide, 200 parts of water, and 2 parts of 2,3-dichloro-1,4-naphthoquinone were charged to a flask of the type used in Example 1 and the mixture was heated to 50–55°. Fifty parts of paraformaldehyde were gradually introduced during about 2 hours with stirring and cooling to maintain the temperature at 50–55°, and the resulting mixture was stirred at 50–55° for an additional hour, to insure completion of the reaction. The reaction mixture was then worked up in the manner described in Example 5.

The product thus obtained consisted essentially of azoxybenzene (it had a setting point of 31.6°) and amounted to 87 parts, which corresponds to a yield of about 88% of theory. A small amount (3% of theory) of aniline was formed, and a small amount (4%) of unreacted nitrobenzene was recovered.

*Part B.*—When the procedure of part A of this example was repeated without the addition of 2,3-dichloro-1,4-naphthoquinone, the nitrobenzene was recovered almost quantitatively.

EXAMPLE 8

*Part A.*—A mixture of 123 parts of nitrobenzene, 275 parts of 50° Bé. aqueous sodium hydroxide, 160 parts of water and 2 parts of 2,3-dichloro-1,4-naphthoquinone was subjected to reduction with 80 parts of butyraldehyde in the manner set out in Example 7, part A. The reaction mixture was then worked up in the manner described in Example 5.

The product obtained as the oil layer weighed 73 parts and had a setting point of 24°. It consisted principally of azoxybenzene together with a small amount of aldol condensation products as impurities. Some aniline (13% of theory) was formed, and 13% of the original nitrobenzene charged was recovered in the steam distillate.

*Part B.*—When the process of part P of this example was repeated without the addition of 2,3-dichloro-1,4-naphthoquinone, about 80% of the original nitrobenzene was recovered and a small amount of tarry oil was produced.

EXAMPLE 9

*Part A.*—The procedure of Example 8, part A, was repeated with 117 parts of benzaldehyde in place of the butyraldehyde. The product obtained as the oil layer consisted essentially of azoxybenzene (it has a setting point of 33.6°) and amounted to 50 parts, which corresponds to about 51% of the theoretical yield based on the nitrobenzene charged. Only a small amount (about 1% of theory) of aniline was formed, and 28% of the original nitrobenzene charged was recovered.

*Part B.*—When the process of part A of this example was repeated without the addition of 2,3-dichloro-1,4-naphthoquinone, substantially no reduction of nitrobenzene occurred (98% of the original nitrobenzene charged was recovered).

EXAMPLE 10

*Part A.*—The procedure of Example 8, part A, was repeated with 106 parts of furfuraldehyde in place of the butyraldehyde. The product obtained as the oil layer consisted principally of azoxybenzene (it had a setting point of 29.6°) and amounted to 56 parts. Only a small amount (about 1% of theory) of aniline was formed, and 20% of the nitrobenzene charged was recovered.

*Part B.*—When the procedure of part A of this example was repeated without the addition of the 2,3-dichloro-1,4-naphthoquinone, a trace of aniline and some tarry material were formed, and 94% of the nitrobenzene charged was recovered.

EXAMPLE 11

*Part A.*—The procedure of Example 8, part A, was repeated using 130 parts of 37% aqueous formaldehyde and 2 parts of 4a,5,8,8a-tetrahydro-1,4-naphthoquinone (obtained by the reaction of 1,3-butadiene on 1,4-benzoquinone) in place of the butyraldehyde and 2,3-dichloro-1,4-naphthoquinone, respectively.

The product thus obtained consisted essentially of azoxybenzene (it had a setting point of 32.4°) and amounted to 85 parts, which corresponds to a yield of about 86% of theory, based on the nitrobenzene charged. Some aniline (7% of theory) was formed, and 3% of the nitrobenzene charged was recovered.

*Part B.*—When the procedure of part A of this example was repeated in the absence of the tetrahydronaphthoquinone, no reduction occurred and the nitrobenzene was recovered almost quantitatively.

*Part C.*—When 2 parts of 1,4-naphthoquinone were employed in the process of part A of this example, instead of the tetra-hydro-naphthoquinone, the result was essentially the same.

EXAMPLE 12

*Part A.*—120 parts of methanol, 50 parts of flaked sodium hydroxide, and 1 part of 2,3-dichloro-1,4-naphthoquinone were charged to a flask of the type described above, the contents were cooled to 30°, and 41 parts of nitrobenzene were added. Then, 108 parts of 37% aqueout formaldehyde were reacted with the mixture, in three portions as follows: the first portion (43 parts) was added at 30–35° during 15 minutes and the mixture was then heated to 50–55°; the second portion (38 parts) was then added and the reaction mixture was heated at 55–60° for an hour; then the third portion (27 parts) was added at 65–70° in 5 minutes and the resulting mixture was heated at 65–70° for an additional half hour to complete the reaction and then was drowned in 1000 parts of water. The precipitate thus obtained was filtered off, washed with 1000 parts of cold water and air dried.

The cream colored product thus obtained consisted essentially of hydrazobenzene (it had a melting point of 125–126°). It weighed 30 parts, which corresponds to a yield of 98% of theory.

*Part B.*—The reduction procedure of part A of this example was repeated without the addition of 2,3-dichloro-1,4-naphthoquinone. Instead of a precipitate being formed, the resulting reaction mass was a liquid. When it was steam distilled, 34 parts (84%) of the nitrobenzene were recovered unchanged from the steam distillate. The still residue contained 4 parts of azoxybenzene (M. P. 34°), which corresponds to a theoretical yield of 12%.

*Part C.*—To determine the extent to which the reduction was effected by the aqueous methanol, in the absence of the formaldehyde and under the extremely mild reaction conditions employed (low temperature and short reaction period), the procedures of parts A and B of this example were repeated with the substitution of an equal volume of water for the aqueous formaldehyde, with and without the addition of 2,3-dichloro-1,4-naphthoquinone. The reaction mixture in each case was steam distilled, as in part B. In the case using 2,3-dichloro-1,4-naphthoquinone, a small amount of azoxybenzene was produced and 90% of the nitrobenzene was recovered unchanged. In the other case, using no dichloro-naphthoquinone, no azoxybenzene was formed and 98% of the nitrobenzene was recovered unchanged.

EXAMPLE 13

*Part A.*—To a warm (50–55°) agitated mixture of 80 parts of methanol, 30 parts of sodium hydroxide flakes, 33 parts of azoxybenzene having a setting point of 34.5°, and 1 part of 2,3-dichloro-1,4-naphthoquinone, 32.4 parts of 37% aqueous formaldehyde were added over the course of a half hour. The resulting mixture was stirred at 50–55° for 2 hours to complete the reduction and was then poured into 600 parts of water. The resulting precipitate was filtered off, washed and dried.

A substantially quantitative yield of hydrazobenzene was obtained (the light cream colored product weighed 30.6 parts and melted at 126°).

*Part B.*—When the procedure of part A of this example was repeated without the addition of 2,3-dichloro-1,4-naphthoquinone, all of the azoxybenzene was recovered unchanged (the product had a setting point of 34.6°).

*Part C.*—When the procedure of part A of this example was repeated without the addition of aqueous formaldehyde, only a small amount of azobenzene was formed in the short reaction period at the low temperature employed. The product, which amounted to 32.5 parts, consisted of about 3% azobenzene and about 97% unreduced azoxybenzene (it had a setting point of 32.2°). Thus, under the conditions of the reaction in part A of this example, the reduction was effected primarily by the formaldehyde.

EXAMPLE 14

The procedure of Example 13, part A, was repeated using one part of 1,4-naphthoquinone in place of the 2,3-dichloro-1,4-naphthoquinone.

The product consisted of a mixture of 85% hydrazobenzene and 15% azobenzene (melting at 118°) and was obtained in substantially quantitative yield (30.5 parts).

The process of the present invention is also of special advantage in connection with the manufacture of 2,2'-dialkoxy-hydrazobenzene from 2-chloro-nitrobenzene. An economical and efficient process for the production of 2,2'-dialkoxy-hydrazobenzene with the aid of naphthoquinoid promoters is disclosed in my copending application Serial No. 448,377, filed of even date herewith. Thus, as set out in said copending application and illustrated in Example 7 thereof, such process involves reacting 2-chloro-nitrobenzene with caustic alkali and a lower alcohol (specifically sodium hydroxide and methanol) in an excess of the alcohol as solvent, whereby the corresponding 2-alkoxy-nitrobenzene (specifically o-nitroanisole) is formed; adding a small amount of a naphthoquinoid promoter (e. g. 2,3-dichloro-1,4-naphthoquinone) and additional alcohol and caustic alkali (e. g. methanol and sodium hydroxide) to the resulting reaction mixture and stirring the mixture (with gentle warming if necessary) until formation of the corresponding dialkoxyazoxybenzene and/or dialkoxyazobenzene is completed; and then adding a reducing sugar (specifically dextrose) in sufficient amount to reduce the azoxy and/or azo compounds to the corresponding ortho-dialkoxy-hydrazobenzene and continuing the reaction until said reduction is complete. In accordance with the present invention, an aldehyde, particularly paraformaldehyde, is added to the resulting reaction mixture in place of part or all of the reducing sugar, and the mixture is stirred for several hours to complete reduction of the azoxy and/or azo compounds to the corresponding 2,2'-dialkoxy-hydrazobenzene (specifically 2,2'-dimethoxy-hydrazobenzene).

This procedure, which is illustrated in the following example, has the advantage that a high yield of hydrazobenzene compound can be obtained, with relatively low yield of primary amine byproducts, by means of reducing agents much less costly than the zinc and caustic alkali formerly employed and without requiring a costly separation of zinc oxide from the product. Further, it decreases the formation of heavy syrupy masses which result from the use of reducing sugars such as dextrose to complete the reduction to the hydrazo stage.

EXAMPLE 15

*Part A.*—Three hundred and fifteen parts of 2-chloro-1-nitrobenzene were added to a solution of 128 parts of sodium hydroxide flakes in 520 parts of methanol. The mixture was stirred for about 22 hours, during which the temperature was gradually raised from 40° to about 65°, to complete formation of o-nitroanisole (2-methoxy-nitrobenzene).

*Part B.*—160 parts of methanol and 4 parts of 2,3-dichloro-1,4-naphthoquinone were added to the mixture thus obtained, after which 190 parts of sodium hydroxide flakes were introduced during about 4 hours while stirring and maintaining the temperature at 55–60° with cooling. The reaction mixture was then stirred at 55–60° for 16 hours to form 2,2'-dimethoxy-azoxybenzene together with some 2,2'-dimethoxy-azobenzene.

*Part C.*—To the reaction mixture thus obtained, 84 parts of paraformaldehyde were added during about 6 hours while stirring and maintaining the temperature at 45–50°. This resulted in complete reduction of the azoazoxy mixture to the hydrazo compound. The reaction mixture thus obtained was steam distilled to remove the methanol, then diluted with 450 parts of hot water, cooled to 30°, and filtered. The filter cake was washed alkali-free with water. When dried, the product melted at 102°, and weighed 236 parts, corresponding to about 96% of the theoretical yield of 2,2'-dimethoxyhydrazobenzene.

As above noted, the invention is not limited to the details of the foregoing illustrative examples and changes may be made without departing from the scope of the invention.

Thus, other aromatic nitrogen compounds containing nitrogen of a reducible form as a substituent in a benzene nucleus may be substituted in place of the specific compounds subjected to reduction in the foregoing specific examples; for example, o-nitrotoluene, m-nitrotoluene, o - nitrochlorobenzene, m - nitrochlorobenzene, p - nitrophenetole, p-nitrobenzoic acid, o-nitrobenzene sulfonic acid, and their reduction products.

Further, it is possible to carry the reduction of a particular reducible aromatic nitrogen compound to other stages than that of a particular specific example, depending on the nature and amount of aldehyde, caustic alkali and naphthoquinoid promoter employed and the particular reaction conditions, such as concentration of water-miscible solvent, temperature, etc. Thus, it is possible to reduce nitrobenzene to hydrazobenzene in a single reaction mixture; however, it is also possible to reduce the nitro compound to the azoxy compound in one reaction mixture, isolate the azoxy compound and then reduce it to the azo- or hydrazo compound with a fresh charge of reactants under suitable conditions in a separate reaction mixture, as illustrated in the foregoing examples.

While, as illustrated in Examples 12 and 13, the nitrogen compound is not reduced to any substantial degree by the alcohol under the preferred conditions therein employed (since the aldehyde is a more rapidly acting reducing agent in the presence of caustic alkali than the alcohol), the invention includes a procedure and reaction conditions where the alcohol also functions as an auxiliary reducing agent; as for example, when carrying out the process for prolonged reaction periods at elevated temperatures and in concentrated alcoholic reaction media.

The products of the reduction can be isolated from the reaction mixtures in any suitable manner. Aside from those cases in which the reaction mixture contains an insoluble residue resulting from the presence of the reduction promoter in the reaction mixture, the isolation of the reduction products can be carried out in the usual manner. For example, the reaction mixture may be cooled to solidify or crystallize the reduction product and filtered, and the filter cake washed with water. In those cases where the product is molten in the hot mixture, the mixture can be stratified into an aqueous phase and an oil phase, which can be readily separated as illustrated in the examples. When a solvent such as methanol is employed, it is preferable to remove the solvent by steam distillation prior to separation of the product from the mass. When the use of the reduction promoter produces a small amount of insoluble by-product, it may be removed by filtering the hot mixture prior to the phase-separation, or in any other suitable manner.

I claim:

1. The improvement in the method of effecting the alkaline reduction of an aromatic nitrogen compound containing nitrogen in a reducible form as a substituent of a benzene nucleus at a higher stage of oxidation than the hydrazo stage with the aid of a naphthoquinoid reduction promoter, which comprises reacting the aromatic nitrogen compound with an aldehyde selected from the group consisting of lower alkanals, aryl aldehydes, and furane aldehydes and a caustic alkali in a reaction medium in which a naphthoquinoid reduction promoter has been incorporated.

2. A method as defined in claim 1, wherein the aldehyde is a lower alkanal.

3. A method as defined in claim 1, wherein the caustic alkali is sodium hydroxide and the aldehyde is formaldehyde.

4. A method as defined in claim 3, wherein the naphthoquinoid reduction promoter is a 1,4-naphthoquinone.

5. A method as defined in claim 3, wherein the naphthoquinoid reduction promoter is 2,3-dichloro-1,4-naphthoquinone.

6. The improvement in the method of effecting the alkaline reduction of a water-insoluble aromatic nitrogen compound containing nitrogen in a reducible form as a substituent of a benzene nucleus at a higher stage of oxidation than the hydrazo stage with the aid of a naphthoquinoid reduction promoter, which comprises reacting the aromatic nitrogen compound with an aldehyde selected from the group consisting of lower alkanals, aryl aldehydes, and furane aldehydes in an aqueous caustic alkali reaction medium in which a naphthoquinoid reduction promoter has been incorporated.

7. The improvement in the method of effecting the alkaline reduction of a water-insoluble aromatic nitrogen compound containing nitrogen in a reducible form as a substituent of a benzene nucleus at a higher stage of oxidation than the hydrazo stage with the aid of a naphthoquinoid reduction promoter, which comprises reacting the aromatic nitrogen compound with an aldehyde selected from the group consisting of lower alkanals, aryl aldehydes, and furane aldehydes and a caustic alkali in a reaction medium which contains a water-miscible organic solvent and in which a naphthoquinoid reduction promoter has been incorporated in small amount.

8. A method as defined in claim 7, wherein the caustic alkali is sodium hydroxide and the solvent is a monohydric alcohol having 1 to 3 carbon atoms.

9. A method as defined in claim 8, wherein the aldehyde is formaldehyde.

10. A method as defined in claim 8, wherein the aromatic nitrogen compound is at a lower stage of oxidation than the nitro stage.

11. A method as defined in claim 8, which comprises mixing together the alcohol, sodium hydroxide, water, the aromatic nitrogen compound, and the naphthoquinoid reduction promoter, and adding the aldehyde to the resulting reaction mixture while maintaining the temperature between 30 and 100° C.

12. The improvement in the method of effecting the alkaline reduction of a water-insoluble aromatic nitrogen compound selected from the group consisting of nitrobenzene, its ortho-methyl, halogen, methoxy and ethoxy derivatives, and their reduction products in which the nitrogen is at a higher stage of oxidation than the hydrazo stage, with the aid of a naphthoquinoid reduction promoter, which comprises mixing together methanol, sodium hydroxide, the reducible aromatic nitrogen compound, and a naphthoquinoid reduction promoter in an aqueous medium, and adding an aldehyde to the resulting reaction mixture while maintaining the temperature between 30 and 100° C., said aldehyde being selected from the group consisting of lower alkanals, aryl aldehydes, and furane aldehydes.

13. A method as defined in claim 12, wherein the naphthoquinoid reduction promoter is a 1,4-naphthoquinone.

14. A method as defined in claim 13, wherein the aldehyde is formaldehyde.

15. The improvement in the method of effecting the alkaline reduction of an aromatic nitrogen compound containing nitrogen in a reducible form as a substituent of a benzene nucleus at a higher stage of oxidation than the hydrazo stage and having a labile halogen nuclear substituent with the aid of a naphthoquinoid reduction promoter, which comprises reacting the aromatic nitrogen compound with an aldehyde and sodium hydroxide in a reaction medium in which a naphthoquinoid reduction promoter has been incorporated, said aldehyde being selected from the group consisting of lower alkanals, aryl aldehydes, and furane aldehydes.

16. The improvement in the method of effecting the alkaline reduction of a water-insoluble aromatic nitrogen compound containing nitrogen in a reducible form as a substituent of a benzene nucleus at a higher stage of oxidation than the hydrazo stage and having a labile chloro nuclear substituent with the aid of a naphthoquinoid reduction promoter, which comprises reacting the aromatic nitrogen compound with sodium hydroxide and an aldehyde selected from the group consisting of lower alkanals, aryl aldehydes, and furane aldehydes in a reaction medium which contains a monohydric alcohol having 1 to 3 carbon atoms and in which a naphthoquinoid reduction promoter has been incorporated in small amount.

17. The method of producing 2,2'-alkoxy-hydrazobenzenes which comprises reacting 2-chloro-nitrobenzene with a lower alcohol and caustic alkali to form the corresponding 2-alkoxy-nitrobenzene, adding to the resulting reaction mixture a naphthoquinoid reduction promoter and reducing the alkoxy-nitrobenzene to at least the corresponding dialkoxy-azoxybenzene stage in said reaction mixture by means of alcohol and caustic alkali, and then carrying the reduction further to the corresponding dialkoxyhydrazobenzene in the said reaction mixture by means of an aldehyde and caustic alkali, said aldehyde being selected from the group consisting of lower alkanals, aryl aldehydes, and furane aldehydes.

18. The method of producing 2,2'-methoxy-hydrazobenzene defined in claim 17, wherein the alcohol is methanol, and the caustic alkali is sodium hydroxide.

19. The method of producing 2,2'-methoxy-hydrazobenzene defined in claim 18, wherein the aldehyde is formaldehyde.

20. A method as defined in claim 15, wherein the aldehyde is formaldehyde and the naphthoquinoid reduction promoter is 2,3-dichloro-1,4-naphthoquinone.

References Cited in the file of this patent

UNITED STATES PATENTS

| | | |
|---|---|---|
| 2,383,134 | Lacey | Aug. 21, 1945 |
| 2,645,636 | Sogn | July 14, 1953 |

OTHER REFERENCES

Rotarski: Chemische Centralblat, 76: 893–894 (1905).
Richter: Textbook of Org. Chem., 1938 ed., page 64.